United States Patent
Boehm et al.

(10) Patent No.: US 12,518,002 B2
(45) Date of Patent: Jan. 6, 2026

(54) VOLTAGE INPUT AND CLOCK SPEED CHANGE DETERMINATION TO DETECT ATTACK

(71) Applicant: Micron Technology, Inc., Boise, ID (US)

(72) Inventors: Aaron P. Boehm, Boise, ID (US); David Hulton, Seattle, WA (US); Jeremy Chritz, Seattle, WA (US); Tamara Schmitz, Scotts Valley, CA (US); Max S. Vohra, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 861 days.

(21) Appl. No.: 17/653,265

(22) Filed: Mar. 2, 2022

(65) Prior Publication Data

US 2023/0205874 A1 Jun. 29, 2023

Related U.S. Application Data

(60) Provisional application No. 63/266,148, filed on Dec. 29, 2021.

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ........ G06F 21/554; G06F 21/73; G06F 21/79; G06F 2221/034; G06F 2221/2143; G11C 16/22

See application file for complete search history.

(56) References Cited

U.S. PATENT DOCUMENTS

| | | |
|---|---|---|
| 2014/0035560 A1* | 2/2014 | Olmos ...................... G06F 1/14 324/76.41 |
| 2016/0299854 A1* | 10/2016 | Deivasigamani ....... G06F 21/79 |
| 2020/0351086 A1* | 11/2020 | Walenta .................. H04L 9/083 |
| 2021/0148957 A1* | 5/2021 | Tuncer ............. G01R 19/16533 |
| 2021/0305177 A1* | 9/2021 | Caillet ................... H05K 1/162 |
| 2021/0347360 A1* | 11/2021 | de la Garza Villarreal ................. B60W 30/146 |

* cited by examiner

*Primary Examiner* — Theodore C Parsons
(74) *Attorney, Agent, or Firm* — Holland & Hart LLP

(57) ABSTRACT

Methods, systems, and devices for voltage input and clock speed change determination to detect an attack are described. In some systems, a memory device may receive first signaling indicative of a first value for an input (e.g., voltage input, clock speed) to the memory device. The memory device may further receive second signaling indicative of a second (e.g., time-delayed) value for the input to the memory device. The memory device may detect a change to the input based on the first signaling and the second signaling. For example, the memory device may compare the first signaling to the second signaling, may compare a difference between the first signaling and the second signaling to a threshold, or both. If the input changes (e.g., by a threshold amount), the memory device may disable one or more features to protect against an attack on the memory device.

35 Claims, 6 Drawing Sheets

VOLTAGE INPUT AND CLOCK SPEED CHANGE DETERMINATION TO DETECT ATTACK

CROSS REFERENCE

The present application for patent claims the benefit of U.S. Provisional Patent Application No. 63/266,148 by Boehm et al., entitled "VOLTAGE INPUT AND CLOCK SPEED CHANGE DETERMINATION TO DETECT ATTACK," filed Dec. 29, 2021, assigned to the assignee hereof, and expressly incorporated by reference herein.

FIELD OF TECHNOLOGY

The following relates generally to one or more systems for memory and more specifically to voltage input and clock speed change determination to detect an attack.

BACKGROUND

Memory devices are widely used to store information in various electronic devices such as computers, user devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., flash memory, may maintain their stored logic state for extended periods of time even in the absence of an external power source. Volatile memory devices, e.g., DRAM, may lose their stored state when disconnected from an external power source.

DETAILED DESCRIPTION

Figure 1:
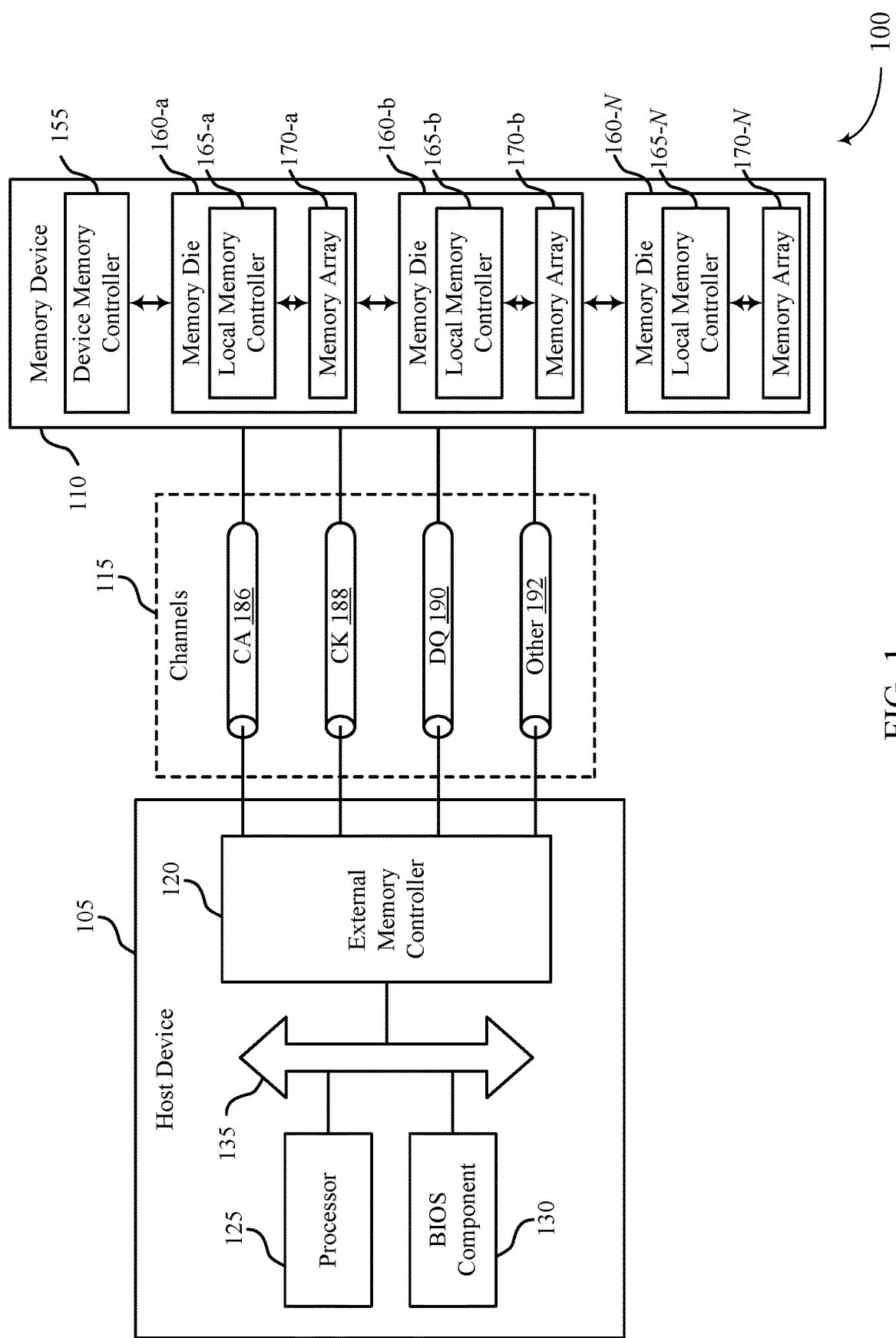
FIG. 1 illustrates an example of a system that supports voltage input and clock speed change determination to detect an attack in accordance with examples as disclosed herein.

A system, such as an automotive system (e.g., a vehicle), may include a host device coupled with a memory device. The host device and the memory device may communicate information (e.g., commands, data) using signaling over one or more channels between the host device and the memory device. In some cases, an attack on the memory device may affect one or more inputs to the memory device (e.g., from the host device or otherwise). For example, modifying (or otherwise affecting) a printed circuit board (PCB) at the memory device (e.g., by adding an interposer, modifying cabling, modifying a socket, or some combination thereof) may cause an abrupt change to a voltage input to the memory device, may affect a clock signal input to the memory device, or may affect some other input to the memory device. Additionally or alternatively, removing the memory device or a component of the memory device (e.g., a dynamic random access memory (DRAM) component) from the system may change one or more inputs to the DRAM component. In some examples, an unauthorized user (e.g., a hacker, a customer) may remove the memory device, such as the DRAM, or otherwise modify the memory device to capture secure communications or read secure information, among other examples, from the memory device, such as the DRAM. Detecting such an attack, before the attack occurs or even as the attack occurs, may allow the memory device—such as the DRAM—to perform operations to mitigate the theft of secure or other information and prevent future theft of secure or other information.

As disclosed herein, a system may support one or more techniques for determining a change to an input of the memory device, such as the DRAM component of the memory device, to detect possible attacks. In some examples, the DRAM may include a detection circuit for determining whether an input signal changes by a threshold amount. The detection circuit may be installed at the DRAM, such that the detection circuit may function even if the DRAM is removed from the system or is otherwise not connected to another components, such as a central processing unit (CPU). The DRAM may receive first signaling indicative of a first value for the input signal (e.g., a voltage input to the DRAM, a clock signal input to the DRAM) and may receive second signaling indicative of a second (e.g., time-delayed) value for the input signal. The DRAM may use a comparator or other component with functionality to determine whether the first signaling is different from the second, time-delayed signaling. For example, the DRAM may determine whether the difference between the first signaling and the second signaling satisfies a threshold value indicating a potential attack on the DRAM. If the DRAM detects that the input has changed (e.g., by a threshold amount), the DRAM may disable one or more features in order to protect against the potential attack on the DRAM. For example, the DRAM may lock or limit specific functionality to protect secure information against attack, may delete specific keys or sensitive information or both from memory, or may perform some combination of these or other actions to protect the data at the DRAM against the potential attack. In this way, the memory device, such as a the DRAM, may detect a change to an input (e.g., even if the DRAM is disconnected from a CPU, a memory device, or a host device) and—in response to the detection—may take protective actions to ensure data stored by the DRAM is secured against any potential attacks (e.g., by locking access to the data, deleting the data, or the like).

Features of the disclosure are initially described in the context of systems and dies as described with reference to FIGS. 1 and 2. Additional features of the disclosure are described in the context of a memory device with a detection circuit and a process flow as described with reference to FIGS. 3 and 4. These and other features of the disclosure are further illustrated by and described with reference to an apparatus diagram and flowcharts that relate to voltage input and clock speed change determination to detect an attack as described with reference to FIGS. 5 and 6.

FIG. 1 illustrates an example of a system 100 that supports voltage input and clock speed change determination to detect an attack in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

In some examples, the system 100 or the host device 105 may include various peripheral components. The peripheral components may be any input device or output device, or an interface for such devices, that may be integrated into or with the system 100 or the host device 105. Examples may include one or more of: a disk controller, a sound controller, a graphics controller, an Ethernet controller, a modem, a universal serial bus (USB) controller, a serial or parallel port, or a peripheral card slot such as peripheral component interconnect (PCI) or specialized graphics ports. The peripheral component(s) may be other components understood by a person having ordinary skill in the art as a peripheral.

In some examples, the system 100 or the host device 105 may include an I/O controller. An I/O controller may manage data communication between the processor 125 and the peripheral component(s), input devices, or output devices. The I/O controller may manage peripherals that are not integrated into or with the system 100 or the host device 105. In some examples, the I/O controller may represent a physical connection or port to external peripheral components.

In some examples, the system 100 or the host device 105 may include an input component, an output component, or both. An input component may represent a device or signal external to the system 100 that provides information, signals, or data to the system 100 or its components. In some examples, and input component may include a user interface or interface with or between other devices. In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dies 160 (e.g., memory chips) to support a desired capacity or a specified capacity for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, clock signal channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

In some examples, the system 100 may be an example of an automotive system (e.g., a vehicle). For example, the host device 105 and the memory device 110 may both be components of a vehicle, and the host device 105, the memory device 110, or both may be further coupled with other components of the vehicle. In some cases, a system 100 may be susceptible to attacks from hackers or other users. For example, a user (e.g., a hacker) may probe a memory device 110, such as a DRAM bus or another type of memory device or component, to determine information from the memory device 110. In this way, the user may gain access to secure information or components (e.g., firmware, keys, plaintext data) of the memory device 110 that is intended to be hidden from or inaccessible to the user. Secure information may be information stored at a device (e.g., a vehicle) or information communicated in an ecosystem (e.g., between the vehicle and other devices or cloud components). In some cases, a user may manipulate information at the vehicle or may manipulate communication information to trigger specific responses, access specific data, or cause other responses at the memory device 110. Secure information may be especially susceptible while a memory device 110 is in an idle state (e.g., operating in a relatively low power mode), which may occur in some vehicle situations, such as when the vehicle is idle for a given duration. Some memory devices 110, such as low-power double data rate (LPDDR) DRAM memory devices, may remain in an idle state for significant periods of time (e.g., days, weeks), during which a user (e.g., a hacker) may attempt to retrieve information (e.g., information that should be otherwise restricted from the user) from the memory device 110. Some vehicle systems may utilize LPDDR DRAM memory for improved power efficiency, but the LPDDR DRAM memory may be potentially susceptible to attacks while the vehicle is parked.

A user (e.g., a hacker) may perform one or more different types of attacks to try to access secure information at a memory device 110. In a first example, the user may physically remove the memory device 110 or a portion of the memory device 110 from the system 100 (e.g., from the vehicle). For example, while the vehicle is turned off and the memory device 110 is in an idle state, the user may remove the memory device 110 and probe the memory device 110 for information (e.g., by detecting information on a DRAM or bus, by putting the memory device 110 into a reader to read out information, or using some other technique). In some cases, the user may remove the DRAM component (e.g., from or as part of a PCB) at the memory device 110, may install an interposer with a breakout cable, and may capture DRAM traffic using a protocol analyzer. In some other cases, the user may freeze the DRAM, other memory device components, or both (e.g., using a substance to supercool the memory device 110 relatively quickly), then remove the cooled memory device 110, and probe the removed memory device 110. For example, the user may remove the DRAM ball grid array (BGA) component from the PCB, solder down the DRAM socket, and install a different DRAM in the socket. This different DRAM may be programmed with data during operation of the vehicle. After the memory device enters a lower power mode such as a sleep mode (e.g., persisting data in RAM), the user may supercool the DRAM (e.g., with freeze spray) and remove the cooled DRAM. Supercooling the DRAM may cause the array to retain at least some data without performing a refresh operation for a significant period of time. The user may place the removed DRAM in another socket board that may be unlocked or have additional test equipment to read the contents of the array, searching for keys to decrypt the secure storage. The user may capture a significant quantity of information (e.g., terabytes of data) over a period of time (e.g., one or more days) while the memory device 110 is removed using one or more of these techniques.

In a second example, a user may probe the memory device 110 while the memory device 110 is in place within the system 100 (e.g., without removing the memory device 110 or a portion of the memory device 110 from the vehicle). For example, if a vehicle remains idle (e.g., parked) for a significant time period (e.g., multiple days or weeks), the user may probe the memory device 110 in place over the course of a few days or a longer duration. Similar to the first example, the user may capture a significant quantity of information (e.g., terabytes of data) over a period of time (e.g., one or more days) without removing the memory device 110 from the system 100.

In a third example, a user may install a third-party device within the system 100 (e.g., on a vehicle, for example, without the knowledge of the vehicle's owner). The third-party device may read or gather information from the memory device 110 and may transmit the information back to the user (e.g., in real-time or according to some periodicity or trigger condition). In some cases, the added third-party device may read information while the vehicle is in operation. For example, the third-party device may use a DRAM logic analyzer or another component to perform channel analysis on the memory device 110, the host device 105, or both. The third-party device may capture and transmit information to the user while the vehicle is parked, while the vehicle is operating, or a combination thereof.

As described herein, if a memory device 110 or a portion of a memory device 110 is removed from the system 100, or if the memory device 110 is modified independent of the original equipment manufacturer (OEM), one or more inputs to the memory device 110 (e.g., to the DRAM component of the memory device 110) may be affected. For example, a cold boot attack—in which a user (e.g., an attacker) resets a DRAM to gain access to the DRAM's boot process or physically swaps the DRAM module into a system controlled by the attacker—may cause inconsistencies in DRAM access, such as causing relatively abrupt voltage changes, causing the clock signal to hang (e.g., over one or more clock signal channels 188), or both. If the DRAM detects such a change to an input, the DRAM may detect a potential attack and may take protective action.

To support detection of an attack, the DRAM may include a detection circuit for determining whether an input signal changes by a threshold amount. The detection circuit may be installed at the DRAM, such that the detection circuit may still function even if the DRAM is removed from the memory device 110 or host device 105. The DRAM may receive first signaling indicative of a first value for an input (e.g., voltage input, clock speed) and may receive second signaling indicative of a second (e.g., time-delayed) value for the input. The DRAM may use a comparator or other functionality to determine whether the first signaling is different from the second signaling (e.g., whether the difference between the first signaling and the second signaling satisfies a threshold value indicating a significant change to the input). If the DRAM detects that the input has changed (e.g., by a threshold amount, within a threshold time), the DRAM may disable one or more features of the DRAM in order to protect against an attack on the DRAM. For example, the DRAM may lock specific functionality to protect secure information against attack, may delete specific keys, sensitive information, or both from memory, or may perform some combination of these or other actions to protect the data at the DRAM against potential attacks.

Though some examples may be described herein in terms of DRAM, ferroelectric RAM (FeRAM), or other capacitive-based memory types, it is to be understood that aspects of the teachings herein may be applied to any memory device (e.g., various types and combinations of volatile memory, non-volatile memory, or some combinations of both). Additionally, although some examples may be described herein in terms of vehicles and automotive systems, it is to be understood that the teachings herein may be applied to any system and various examples outside of the vehicle context, which is merely one example implementation.

Figure 2:
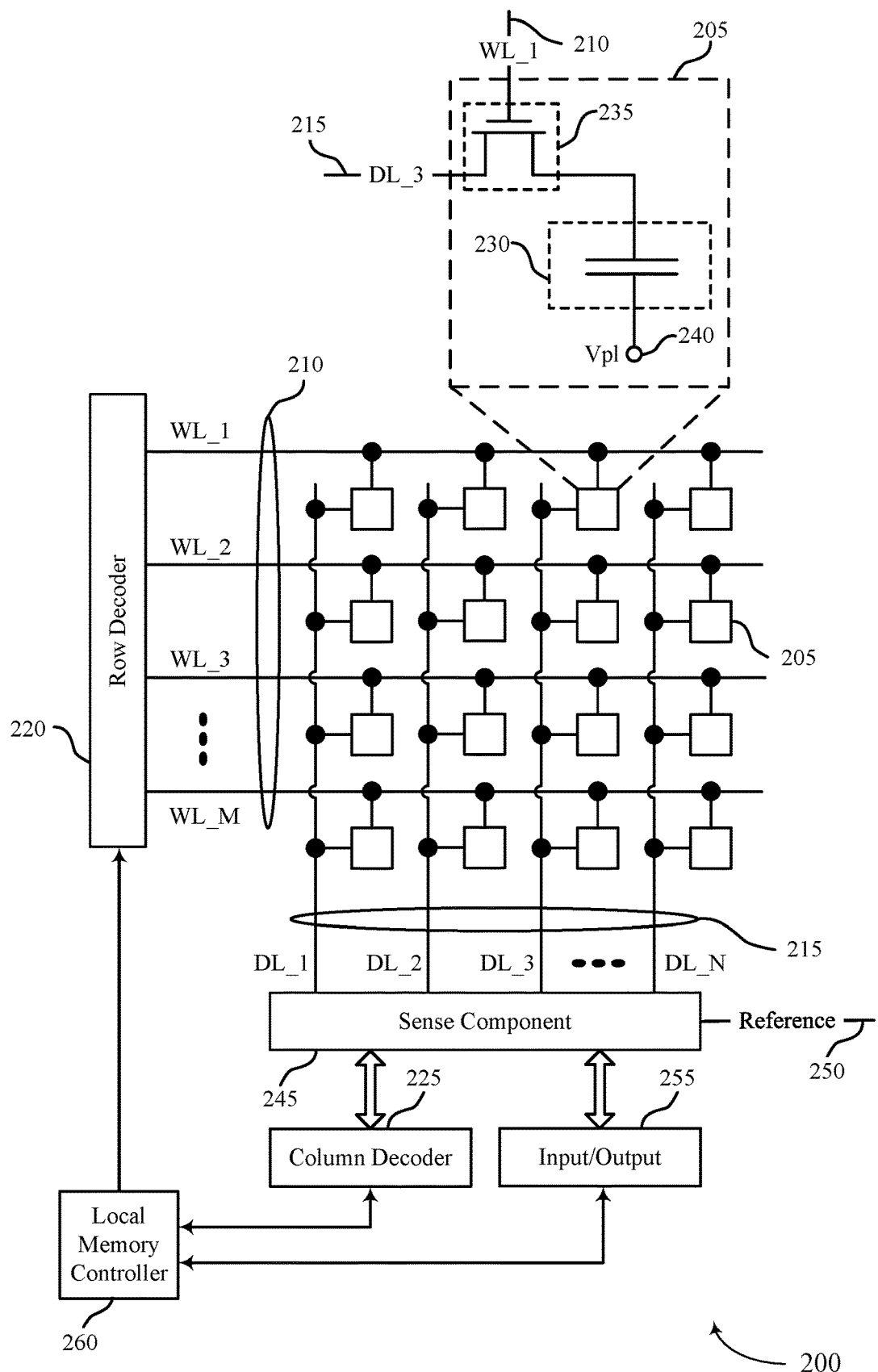
FIG. 2 illustrates an example of a memory die that supports voltage input and clock speed change determination to detect an attack in accordance with examples as disclosed herein.

FIG. 2 illustrates an example of a memory die 200 that supports voltage input and clock speed change determination to detect an attack in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired logic state. The local memory controller 260 may identify a target memory cell 205 on which to perform the write operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The local memory controller 260 may apply a specific signal (e.g., write pulse) to the digit line 215 during the write operation to store a specific state (e.g., charge) in the capacitor 230 of the memory cell 205. The pulse used as part of the write operation may include one or more voltage levels over a duration.

The local memory controller 260 may be operable to perform a read operation (e.g., a sense operation) on one or more memory cells 205 of the memory die 200. During a read operation, the logic state stored in a memory cell 205 of the memory die 200 may be determined. The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference 250. Based on that comparison, the sense component 245 may determine a logic state that is stored on the memory cell 205.

The memory die 200 may be associated with a DRAM architecture. For example, the memory die 200 may store data within a DRAM module that includes the memory cells 205. In some examples, the memory die 200 may support disabling one or more features for improved security in response to detecting a change to an input (e.g., a voltage input, a clock speed, or another input signal). For example, the memory die 200 may refrain from performing one or more access functions based on disabling an access feature. In this way, if an attacker gains access to the memory die 200 by remove or modifying the DRAM, the DRAM may lock access to one or more memory cells 205 of the memory die 200. If the attacker attempts to perform a read operation or a write operation on the one or more memory cells 205, the local memory controller 260 may refrain from performing the read operation or the write operation. In some cases, the DRAM may set a flag at the local memory controller 260 in response to detecting the change to the input signal, and the local memory controller 260 may refrain from performing the access operations based on the flag. Additionally or alternatively, the DRAM may disable one or more features using one or more other techniques. For example, the DRAM may trigger erasing data from the memory die 200 (e.g., setting a voltage stored at one or more memory cells 205 storing the data to a default voltage) in response to detecting the change to the input signal. Accordingly, the memory die 200, the local memory controller 260, or a combination thereof may protect information stored in one or more memory cells 205 in response to the DRAM detecting the change to the input signal.

Figure 3:
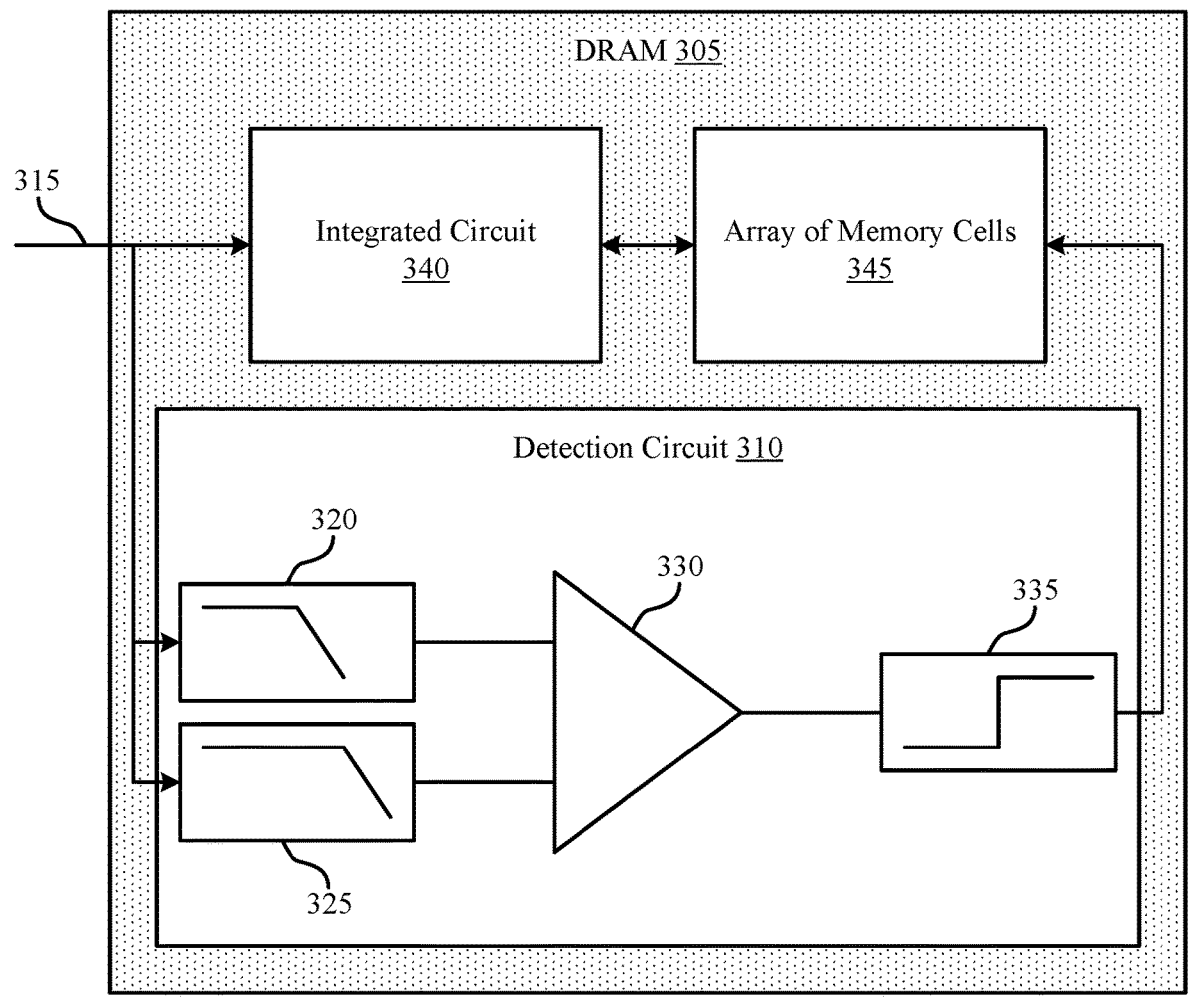
FIG. 3 illustrates an example of a circuit that supports voltage input and clock speed change determination to detect an attack in accordance with examples as disclosed herein.

FIG. 3 illustrates an example of a memory device 300 that supports voltage input and clock speed change determination to detect an attack in accordance with examples as disclosed herein. The memory device 300 may be an example of a memory device described with reference to FIGS. 1 and 2. The memory device 300 may include or be an example of a DRAM 305, which may include a detection circuit 310 for detecting a change to a voltage input, a clock speed, or some other input 315. The detection circuit 310 may include a first input signal 320 and a time-delayed input signal 325, where the first input signal 320 and the time-delayed input signal 325 correspond to a same input 315 (e.g., a voltage input, a clock signal, or another input signal). The detection circuit 310 may compare the first input signal 320 and the time-delayed input signal 325 using a comparator 330 to determine whether a change has occurred to the input 315. In some cases, a change to the input 315 may indicate a potential attack on the memory device 300. If a change to the input 315 is detected, the comparator 330 may generate a signal 335 to lock one or more features of the memory device 300 to protect against the potential attack. In some examples, the detection circuit 310 may be an example of a resistor-capacitor (RC) circuit. In some other examples, the memory device 300 may include a relatively more complex circuit, system, or algorithm for detecting a change to an input 315.

The DRAM 305 may be an example of an apparatus. The DRAM 305 may include an integrated circuit 340 coupled with an array of memory cells 345. In some examples, the array of memory cells 345 may be an example of a memory die 200 as described with reference to FIG. 2. The array of memory cells 345 may include memory cells—such as memory cells 205 as described with reference to FIG. 2—that each may include capacitive storage elements. The DRAM 305 may use the array of memory cells 345 to store data (e.g., for a host device). The integrated circuit 340 may modify values written to the capacitive storage elements (e.g., using write operations, as described with reference to FIG. 2) based on one or more inputs 315. For example, the integrated circuit 340 may receive a voltage input, a clock speed, or both and may modify one or more values written to one or more capacitive storage elements of the array of memory cells 345 based on the voltage input, the clock speed, or both.

Additionally, the DRAM 305 may include circuitry (e.g., the detection circuit 310) coupled with the integrated circuit 340. The detection circuit 310 may support detection of a change to an input 315 to protect against an attack on the DRAM 305. For example, as described with reference to FIG. 1, a DRAM 305 may be vulnerable to a "cold boot" attack. In a cold boot attack, a user (e.g., an attacker) with local physical access to the DRAM 305 may gain access to the contents of the DRAM 305 (e.g., data stored in the array of memory cells 345, keys stored in the DRAM 305) by resetting the DRAM 305 to gain access to the boot process, by physically stopping and swapping the DRAM 305 out of a first system (e.g., an automotive system in which the DRAM 305 is initially installed) and into a second system controlled by the attacker, or some combination thereof. By gaining access to the boot process or the DRAM 305, the attacker may attempt to access secure information stored at the DRAM 305 (e.g., by accessing encryption keys to decrypt the secure information).

Some systems may support protections to protect against cold boot attacks. Such protections may involve securing the boot process for the DRAM 305, encrypting the data in the DRAM 305, or both. However, such protections may use CPU support, which may be unavailable in some situations. For example, if an attacker physically removes the DRAM 305 from a system, the DRAM 305 may lose a connection with a CPU, which then prevents the protections. Accordingly, removing the DRAM 305 may remove some of these cold boot protections for the DRAM 305.

In contrast, the memory device 300 may include a detection circuit 310 within the DRAM 305, the integrated circuit 340, or some combination thereof. For example, the circuitry (e.g., the detection circuit 310) may be installed on the voltage input to the integrated circuit 340, on the clock input to the integrated circuit 340, or elsewhere in the DRAM 305. By including the detection logic within the DRAM integrated circuit or module, the detection logic may function properly even if the DRAM 305 is not connected to a CPU. In this way, the DRAM 305 may perform detection functionality and one or more corrective actions even if the DRAM 305 is removed from a system (e.g., as part of an attack on the DRAM 305).

In some cases, cold boot attacks may cause inconsistencies in DRAM 305 access. For example, a cold boot attack may cause fluctuations in some of the inputs 315 to a DRAM module, to the memory device 300, or both. In some examples, the cold boot attack may cause an abrupt change in a voltage input to the DRAM 305 (e.g., the voltage input may drop to zero). That is, the voltage input to the DRAM 305 may change by a threshold amount within a threshold time period. Additionally or alternatively, the cold boot attack may cause a clock signal input to the DRAM 305 to hang (e.g., lag or otherwise fail to indicate proper timing due to a voltage change in the clock signal). For example, the clock signal may miss one or more steps. In some cases, a change in the clock signal may be additionally or alternatively referred to as a change in the clock speed.

The detection circuit 310 may detect whether a change to an input 315 (e.g., the voltage input, the clock speed) has occurred and—if a change is detected—may signal the DRAM 305 to perform one or more protective actions. In some examples, the protective actions may involve clearing contents of the memory (e.g., in the array of memory cells 345), locking specific access operations, or similarly disabling one or more features of the DRAM 305. For example, the DRAM 305 may erase one or more keys (e.g., secret keys, encryption keys), erase sensitive information, or both from memory if a potential attack is detected based on the detection circuit 310 detecting a change to an input 315 (e.g., a change satisfying a threshold value). In some cases, the detection circuit 310 may be a detection circuit (e.g., an RC circuit) to reduce complexity, processing overhead, and signaling overhead at the DRAM 305.

As an example, the detection circuit 310 may receive a first voltage input (e.g., the first input signal 320) corresponding to a value for the voltage input (e.g., the input 315) that is currently received at the apparatus (e.g., the memory device 300). The value "currently received" may be a value most-recently received at the apparatus, a value received within at least a threshold time period (e.g., within 100 milliseconds (ms) or some other time window), an average value received within a threshold time period, or some other value indicating an estimate of the DRAM 305 as to a current state of the input 315. The detection circuit 310 may additionally receive a second voltage input (e.g., the time-delayed input signal 325) corresponding to a value for the voltage input (e.g., the input 315) that is time-delayed from the value that is currently received at the apparatus. Specifically, the time-delayed value for the voltage input may be any value for the input 315 received prior to the "current state" of the input 315. For example, the time-delayed value may be the value of the input 315 a specific amount of time prior to the current state (e.g., 100 ms prior to the current state of the input 315), within a time window prior to the current state of the input 315, or may be time-delayed in some other way. In some cases, the time-delay may be achieved physically using the physical aspects of the detection circuit 310 or may be achieved using an electrical component of the detection circuit 310 (e.g., using an RC circuit or more complex configurations or techniques, such as regular polling or a bucket brigade configuration). In this way, if the DRAM 305 experiences a power drop, the time-delayed input signal 325 may maintain a higher voltage for longer than the first input signal 320, effectively capturing the change occurring in the voltage input.

The detection circuit 310 may send the first voltage input and the second voltage input to a comparator 330. The comparator 330 may compare the first voltage input to the second voltage input in order to detect a change to the voltage input, the change satisfying a threshold. For example, if the first voltage input is different from the second voltage input by at least the threshold value, the detection circuit 310 may determine that the input 315 has changed. In contrast, if the first voltage input is different from the second voltage input by less than the threshold value, the detection circuit 310 may determine that the input 315 is unchanged or that any change to the input 315 is negligible (e.g., within an error threshold for normal operating conditions).

If the detection circuit 310 detects a change to the voltage input satisfying the threshold, the detection circuit 310 may generate a signal 335 to perform one or more protective actions for the DRAM 305. For example, the comparator 330 may generate the signal 335 as a result of the difference between the first voltage input and the second voltage input. The DRAM 305 may write one or more values of zero to one or more capacitive storage elements of the array of memory cells 345 in response to detecting that the change to the voltage input satisfies the threshold. In some examples, the generated signal 335 may trigger the DRAM 305 to write the one or more values of zero to the one or more capacitive storage elements. Additionally or alternatively, the generated signal 335 may trigger the DRAM 305 to remove one or more keys from the array of memory cells 345 in response to detecting that the change to the voltage input satisfies the threshold. In this way, the detection circuit 310 may effectively disable one or more features of the DRAM 305 by erasing (e.g., writing zeroes to) data, keys, or both from the DRAM 305. Additionally or alternatively, the generated signal 335 may trigger the DRAM 305 to lock access to one or more portions of the array of memory cells 345 (e.g., portions configured to store secure information), lock access to one or more functions of the DRAM 305 (e.g., such that the DRAM 305 refrains from performing read operations, write operations, or other operations), or both. By including the detection circuit 310 on the DRAM module, the DRAM integrated circuit 340, or both, the DRAM 305 may clear the contents of memory using the integrated circuit 340 and without using a CPU report, such that the detection and protective actions may be performed internal to the DRAM 305.

Additionally or alternatively, the detection circuit 310 may detect changes to a clock speed. In some cases, the DRAM 305 may include multiple detection circuits 310 to check for changes to multiple inputs (e.g., voltage, clock speed, or other inputs 315). In some other cases, one detection circuit 310 may check for changes to multiple inputs 315. As an example, the detection circuit 310 may receive a first clock speed (e.g., the first input signal 320) corresponding to a value for the clock speed (e.g., the input 315) that is currently received at the apparatus (e.g., the memory device 300). The detection circuit 310 may additionally receive a second clock speed (e.g., the time-delayed input signal 325) corresponding to a value for the clock speed (e.g., the input 315) that is time-delayed from the value that is currently received at the apparatus. The detection circuit 310 may send the first clock speed and the second clock speed to the comparator 330. The comparator 330 may compare the first clock speed to the second clock speed in order to detect a change to the clock speed, the change satisfying a threshold. If the detection circuit 310 detects a change to the clock speed satisfying the threshold, the detection circuit 310 may generate a signal 335 to perform one or more protective actions for the DRAM 305. For example, the comparator 330 may generate the signal 335 as a result of the difference between the first clock speed and the second clock speed. The DRAM 305 may write one or more values of zero to one or more capacitive storage elements of the array of memory cells 345 in response to detecting that the change to the clock speed satisfies the threshold. In some examples, the generated signal 335 may trigger the DRAM 305 to write the one or more values of zero to the one or more capacitive storage elements. Additionally or alternatively, the generated signal 335 may trigger the DRAM 305 to remove one or more keys from the array of memory cells 345 in response to detecting that the change to the clock speed satisfies the threshold.

In some cases, the detection circuit 310 may operate during specific processes and may refrain from operating during other processes to improve the efficiency of the DRAM 305. For example, the detection circuit 310 may check for changes to an input 315 during boot up (e.g., when such changes to an input 315 may occur during a cold boot attack). Implementing a simple detection circuit 310 may allow the DRAM 305 to relatively quickly determine whether a potential attack has occurred (e.g., within a threshold time). In this way, the DRAM 305 may detect a change to an input 315 and perform one or more corrective actions within a time window during boot up (e.g., a 300 ms time window), such that the corrective actions are performed before boot up is complete (e.g., prior to start-up time for the DRAM 305) and an attacker is potentially granted access to the DRAM 305. In some other cases, the detection circuit 310 may operate continuously to detect if the DRAM 305 is removed from a system (e.g., which may cause the voltage input to the DRAM 305 to drop to zero at any time).

Figure 4:
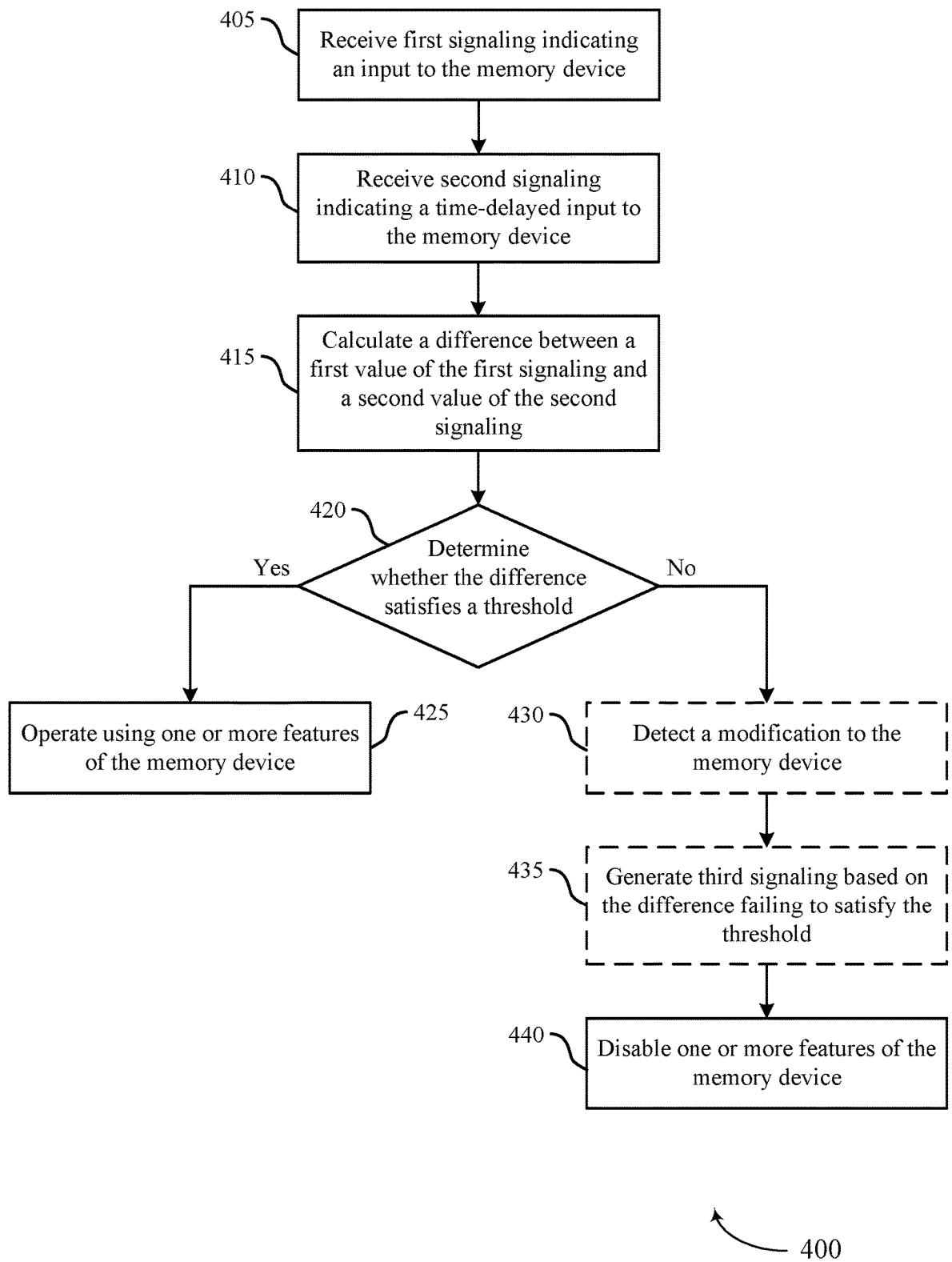
FIG. 4 illustrates an example of a process flow that supports voltage input and clock speed change determination to detect an attack in accordance with examples as disclosed herein.

FIG. 4 illustrates an example of a process flow 400 that supports voltage input and clock speed change determination to detect an attack in accordance with examples as disclosed herein. The process flow 400 may be performed by devices described with reference to FIGS. 1 through 3. For example, a memory device—such as a memory device 110 or a memory device 300—may perform one or more aspects of the process flow 400. In some examples, the memory device may be associated with (e.g., a component of) a vehicle. The memory device may include—or be an example of—a DRAM. The process flow 400 may support detection of a memory device attack based on detecting a change to an input of the memory device, the DRAM, or both, as described with reference to FIG. 3. Alternative examples of the following features described may be implemented, where some steps are performed in a different order or not at all. Additionally, some steps may include additional features not mentioned below.

Aspects of the process flow 400 may be implemented by a controller, among other components (e.g., a memory device controller). Additionally or alternatively, aspects of the process flow 400 may be implemented by logic coupled with a memory device. For example, the logic may be operable to cause an apparatus to perform the operations of the process flow 400.

At 405, the memory device may receive first signaling indicative of a first value for an input to the memory device, as described with reference to the first input signal 320 of FIG. 3. The first value for the input may be an example of a value currently measured at the memory device for the input. The memory device may use a most-recent value (or a set of most-recent values) as the currently measured value for the input. That is, the currently measured value may correspond to a value received at the memory device within a time threshold, an average of one or more values received at the memory device within a time threshold (e.g., with outliers removed), or some combination thereof. The input to the memory device may be an example of a voltage input to the memory device, a clock signal or clock speed that is input to the memory device, or some other input to the memory device.

At 410, the memory device may receive second signaling indicative of a second value for the input to the memory device, the second value for the input delayed in time compared to the first value for the input. For example, the second value for the input may be a value previously measured at the memory device for the input, where the second value for the input may have been measured at least a threshold time before the first value for the input is measured.

At 415, the memory device may calculate a difference between the first value for the input and the second value for the input. At 420, the memory device may perform a comparison of the first value for the input to the second value for the input. For example, the memory device may compare the difference between the first value for the input and the second value for the input to a threshold. The memory device may determine whether the difference satisfies the threshold.

If the difference satisfies the threshold, at 425, the memory device may operate using one or more features of the memory device. For example, if the difference is less than (or equal to) the threshold, the memory device may determine that the input has not changed (or has changed a negligible amount, within normal operating conditions). As such, the memory device may operate normally, granting access to data according to normal operating procedures for the memory device.

If the difference fails to satisfy the threshold, in some cases, at 430, the memory device may detect a modification to the memory device. For example, if the difference exceeds the threshold, the memory device may determine that the input has changed a significant amount. The memory device may detect the change to the input to the memory device based on the comparison of the first value for the input to the second value for the input failing to satisfy the threshold. In some cases, the memory device may be—or include—a DRAM component, and the modification to the memory device may involve decoupling the DRAM component from a second memory device, decoupling the DRAM component from a host device, or both. For example, if the DRAM is installed in an automotive system, the modification to the DRAM may involve the DRAM being removed from the automotive system (e.g., as part of a cold boot attack). Additionally or alternatively, the modification to the memory device may involve adding an interposer to the memory device, adding cabling to the memory device, adding a socket to the memory device, or any combination thereof.

At 435, the memory device may generate third signaling based on the difference failing to satisfy the threshold. In some examples, the memory device may generate the third signaling using circuitry for detecting a change to a voltage input to the memory device, the circuitry coupled with an integrated circuit of the memory device, and the first signaling and the second signaling received by the circuitry for detecting the change to the voltage input. In some other examples, the memory device may generate the third signaling using circuitry for detecting a change to a clock speed that is input to the memory device, the circuitry for detecting the change to the clock speed coupled with the integrated circuit of the memory device, where the first signaling and the second signaling may be received by the circuitry for detecting the change to the clock speed. Such circuitry may be an example of the detection circuit 310 described with reference to FIG. 3.

At 440, the memory device may disable one or more features of the memory device based on the comparison of the first value for the input to the second value for the input failing to satisfy the threshold. For example, the memory device may write one or more values of zero to one or more capacitive storage elements of the memory device (e.g., in response to the third signaling generated at 435). Additionally or alternatively, the memory device may remove one or more keys from non-volatile memory at the memory device (e.g., in response to the third signaling generated at 435). In this way, the memory device may protect against attack if the memory device detects a change to an input to the memory device.

Figure 5:
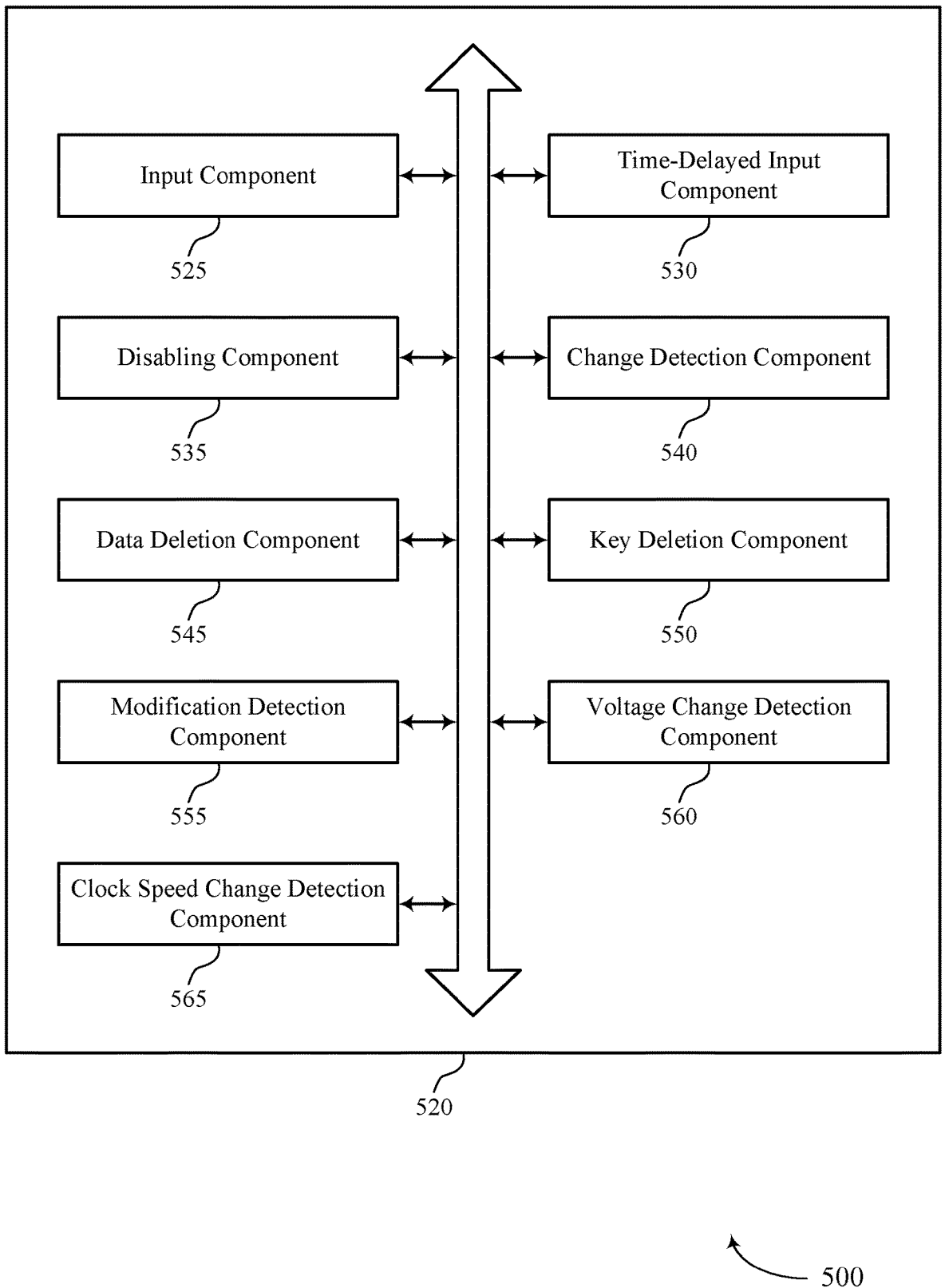
FIG. 5 shows a block diagram of a memory device that supports voltage input and clock speed change determination to detect an attack in accordance with examples as disclosed herein.

FIG. 5 shows a block diagram 500 of a memory device 520 that supports voltage input and clock speed change determination to detect an attack in accordance with examples as disclosed herein. The memory device 520 may be an example of aspects of a memory device as described with reference to FIGS. 1 through 4. The memory device 520, or various components thereof, may be an example of means for performing various aspects of voltage input and clock speed change determination to detect an attack as described herein. For example, the memory device 520 may include an input component 525, a time-delayed input component 530, a disabling component 535, a change detection component 540, a data deletion component 545, a key deletion component 550, a modification detection component 555, a voltage change detection component 560, a clock speed change detection component 565, or any combination thereof. Each of these components may communicate, directly or indirectly, with one another (e.g., via one or more buses).

The input component 525 may be configured as or otherwise support a means for receiving, at a memory device, first signaling indicative of a first value for an input to the memory device. The time-delayed input component 530 may be configured as or otherwise support a means for receiving, at the memory device, second signaling indicative of a second value for the input to the memory device, the second value for the input delayed in time compared to the first value for the input. The disabling component 535 may be configured as or otherwise support a means for disabling one or more features of the memory device based at least in part on a comparison of the first value for the input to the second value for the input failing to satisfy a threshold.

In some examples, the change detection component 540 may be configured as or otherwise support a means for detecting a change to the input to the memory device based at least in part on the comparison of the first value for the input to the second value for the input failing to satisfy the threshold, where disabling the one or more features of the memory device is based at least in part on detecting the change to the input to the memory device.

In some examples, the input to the memory device includes a voltage input to the memory device. In some examples, the voltage change detection component 560 may be configured as or otherwise support a means for generating third signaling using circuitry for detecting a change to the voltage input to the memory device, the circuitry for detecting the change to the voltage input coupled with an integrated circuit of the memory device, where the first signaling and the second signaling are received by the circuitry for detecting the change to the voltage input, and where disabling the one or more features of the memory device is based at least in part on the third signaling. In some examples, the circuitry for detecting the change to the voltage input includes an RC circuit.

In some examples, the input to the memory device includes a clock speed that is input to the memory device. In some examples, the clock speed change detection component 565 may be configured as or otherwise support a means for generating third signaling using circuitry for detecting a change to the clock speed that is input to the memory device, the circuitry for detecting the change to the clock speed coupled with an integrated circuit of the memory device, where the first signaling and the second signaling are received by the circuitry for detecting the change to the clock speed, and where disabling the one or more features of the memory device is based at least in part on the third signaling. In some examples, the circuitry for detecting the change to the clock speed includes an RC circuit.

In some examples, the change detection component 540 may be configured as or otherwise support a means for calculating a difference between the first value for the input and the second value for the input. In some examples, the change detection component 540 may be configured as or otherwise support a means for comparing the difference between the first value for the input and the second value for the input to the threshold, where the comparison of the first value for the input to the second value for the input fails to satisfy the threshold based at least in part on the difference exceeding the threshold.

In some examples, the first value for the input includes a value currently measured at the memory device for the input. In some examples, the second value for the input includes a value previously measured at the memory device for the input, the second value for the input measured at least a threshold time before the first value for the input is measured.

In some examples, the change detection component 540 may be configured as or otherwise support a means for generating third signaling based at least in part on the comparison of the first value for the input to the second value for the input failing to satisfy the threshold. In some examples, the data deletion component 545 may be configured as or otherwise support a means for writing one or more values of zero to one or more capacitive storage elements of the memory device in response to the third signaling, where disabling the one or more features of the memory device includes at least writing the one or more values of zero to the one or more capacitive storage elements.

In some examples, the change detection component 540 may be configured as or otherwise support a means for generating third signaling based at least in part on the comparison of the first value for the input to the second value for the input failing to satisfy the threshold. In some examples, the key deletion component 550 may be configured as or otherwise support a means for removing one or more keys from non-volatile memory at the memory device in response to the third signaling, where disabling the one or more features of the memory device includes at least removing the one or more keys from the non-volatile memory.

In some examples, the modification detection component 555 may be configured as or otherwise support a means for detecting a modification to the memory device based at least in part on the comparison of the first value for the input to the second value for the input failing to satisfy the threshold, where disabling the one or more features of the memory device is based at least in part on detecting the modification to the memory device.

In some examples, the memory device includes a DRAM component. In some examples, the modification to the memory device includes decoupling the DRAM component from a second memory device, decoupling the DRAM component from a host device, or both. In some examples, the modification to the memory device includes adding an interposer to the memory device, adding cabling to the memory device, adding a socket to the memory device, or any combination thereof.

Figure 6:
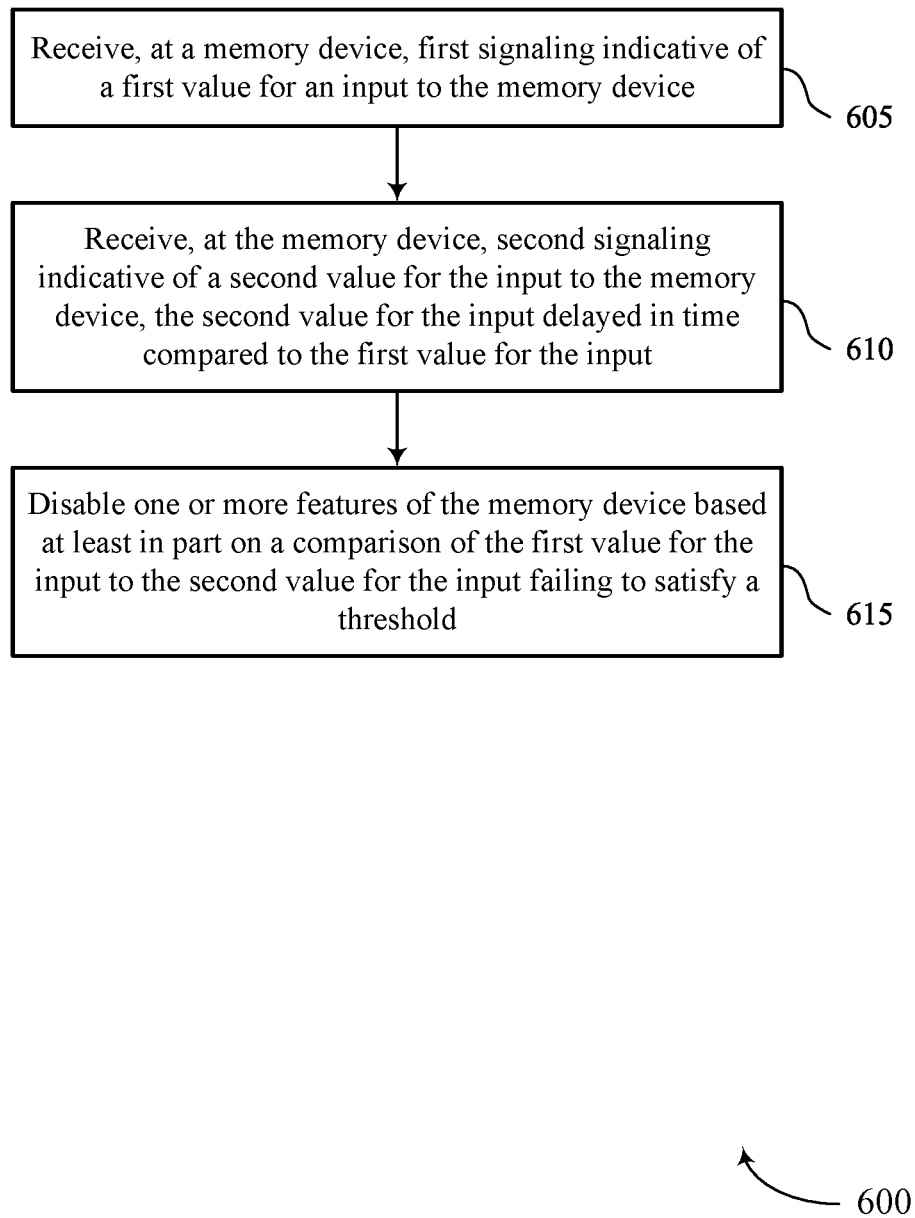
FIG. 6 shows a flowchart illustrating a method that supports voltage input and clock speed change determination to detect an attack in accordance with examples as disclosed herein.

FIG. 6 shows a flowchart illustrating a method 600 that supports voltage input and clock speed change determination to detect an attack in accordance with examples as disclosed herein. The operations of method 600 may be implemented by a memory device or its components as described herein. For example, the operations of method 600 may be performed by a memory device as described with reference to FIGS. 1 through 5. In some examples, a memory device may execute a set of instructions to control the functional elements of the device to perform the described functions. Additionally or alternatively, the memory device may perform aspects of the described functions using special-purpose hardware.

At 605, the method may include receiving, at a memory device, first signaling indicative of a first value for an input to the memory device. The operations of 605 may be performed in accordance with examples as disclosed herein. In some examples, aspects of the operations of 605 may be performed by an input component 525 as described with reference to FIG. 5.

At 610, the method may include receiving, at the memory device, second signaling indicative of a second value for the input to the memory device, the second value for the input delayed in time compared to the first value for the input. The operations of 610 may be performed in accordance with examples as disclosed herein. In some examples, aspects of the operations of 610 may be performed by a time-delayed input component 530 as described with reference to FIG. 5.

At 615, the method may include disabling one or more features of the memory device based at least in part on a comparison of the first value for the input to the second value for the input failing to satisfy a threshold. The operations of 615 may be performed in accordance with examples as disclosed herein. In some examples, aspects of the operations of 615 may be performed by a disabling component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory device, first signaling indicative of a first value for an input to the memory device; receiving, at the memory device, second signaling indicative of a second value for the input to the memory device, the second value for the input delayed in time compared to the first value for the input; and disabling one or more features of the memory device based at least in part on a comparison of the first value for the input to the second value for the input failing to satisfy a threshold.

Aspect 2: The method, apparatus, or non-transitory computer-readable medium of aspect 1, further including operations, features, circuitry, logic, means, or instructions, or any combination thereof for detecting a change to the input to the memory device based at least in part on the comparison of the first value for the input to the second value for the input failing to satisfy the threshold, where disabling the one or more features of the memory device is based at least in part on detecting the change to the input to the memory device.

Aspect 3: The method, apparatus, or non-transitory computer-readable medium of any of aspects 1 through 2 where the input to the memory device includes a voltage input to the memory device.

Aspect 4: The method, apparatus, or non-transitory computer-readable medium of aspect 3, further including operations, features, circuitry, logic, means, or instructions, or any combination thereof for generating third signaling using circuitry for detecting a change to the voltage input to the memory device, the circuitry for detecting the change to the voltage input coupled with an integrated circuit of the memory device, where the first signaling and the second signaling are received by the circuitry for detecting the change to the voltage input, and where disabling the one or more features of the memory device is based at least in part on the third signaling.

Aspect 5: The method, apparatus, or non-transitory computer-readable medium of aspect 4 where the circuitry for detecting the change to the voltage input includes an RC circuit.

Aspect 6: The method, apparatus, or non-transitory computer-readable medium of any of aspects 1 through 5 where the input to the memory device includes a clock speed that is input to the memory device.

Aspect 7: The method, apparatus, or non-transitory computer-readable medium of aspect 6, further including operations, features, circuitry, logic, means, or instructions, or any combination thereof for generating third signaling using circuitry for detecting a change to the clock speed that is input to the memory device, the circuitry for detecting the change to the clock speed coupled with an integrated circuit of the memory device, where the first signaling and the second signaling are received by the circuitry for detecting the change to the clock speed, and where disabling the one or more features of the memory device is based at least in part on the third signaling.

Aspect 8: The method, apparatus, or non-transitory computer-readable medium of aspect 7 where the circuitry for detecting the change to the clock speed includes an RC circuit.

Aspect 9: The method, apparatus, or non-transitory computer-readable medium of any of aspects 1 through 8, further including operations, features, circuitry, logic, means, or instructions, or any combination thereof for calculating a difference between the first value for the input and the second value for the input and comparing the difference between the first value for the input and the second value for the input to the threshold, where the comparison of the first value for the input to the second value for the input fails to satisfy the threshold based at least in part on the difference exceeding the threshold.

Aspect 10: The method, apparatus, or non-transitory computer-readable medium of any of aspects 1 through 9 where the first value for the input includes a value currently measured at the memory device for the input and the second value for the input includes a value previously measured at the memory device for the input, the second value for the input measured at least a threshold time before the first value for the input is measured.

Aspect 11: The method, apparatus, or non-transitory computer-readable medium of any of aspects 1 through 10, further including operations, features, circuitry, logic, means, or instructions, or any combination thereof for generating third signaling based at least in part on the comparison of the first value for the input to the second value for the input failing to satisfy the threshold and writing one or more values of zero to one or more capacitive storage elements of the memory device in response to the third signaling, where disabling the one or more features of the memory device includes at least writing the one or more values of zero to the one or more capacitive storage elements.

Aspect 12: The method, apparatus, or non-transitory computer-readable medium of any of aspects 1 through 11, further including operations, features, circuitry, logic, means, or instructions, or any combination thereof for generating third signaling based at least in part on the comparison of the first value for the input to the second value for the input failing to satisfy the threshold and removing one or more keys from non-volatile memory at the memory device in response to the third signaling, where disabling the one or more features of the memory device includes at least removing the one or more keys from the non-volatile memory.

Aspect 13: The method, apparatus, or non-transitory computer-readable medium of any of aspects 1 through 12, further including operations, features, circuitry, logic, means, or instructions, or any combination thereof for detecting a modification to the memory device based at least in part on the comparison of the first value for the input to the second value for the input failing to satisfy the threshold, where disabling the one or more features of the memory device is based at least in part on detecting the modification to the memory device.

Aspect 14: The method, apparatus, or non-transitory computer-readable medium of aspect 13 where the memory device includes a DRAM component and the modification to the memory device includes decoupling the DRAM component from a second memory device, decoupling the DRAM component from a host device, or both.

Aspect 15: The method, apparatus, or non-transitory computer-readable medium of any of aspects 13 through 14 where the modification to the memory device includes adding an interposer to the memory device, adding cabling to the memory device, adding a socket to the memory device, or any combination thereof.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 16: An apparatus, including: an array of memory cells that each include capacitive storage elements; an integrated circuit coupled with the array of memory cells and operable to: receive a voltage input; and modify values written to the capacitive storage elements based at least in part on the voltage input; and circuitry coupled with the integrated circuit and operable to: detect a change to the voltage input, the change satisfying a threshold; and write one or more values of zero to one or more capacitive storage elements of the capacitive storage elements in response to detecting that the change to the voltage input satisfies the threshold.

Aspect 17: The apparatus of aspect 16, where the circuitry coupled with the integrated circuit is further operable to: receive a first voltage input corresponding to a value for the voltage input that is currently received at the apparatus; and receive a second voltage input corresponding to a value for the voltage input that is time-delayed from the value that is currently received at the apparatus, where detecting that the change to the voltage input satisfies the threshold is based at least in part on the first voltage input and the second voltage input.

Aspect 18: The apparatus of any of aspects 16 through 17, where the circuitry coupled with the integrated circuit is further operable to: generate a signal to write the one or more values of zero to the one or more capacitive storage elements in response to detecting that the change to the voltage input satisfies the threshold.

Aspect 19: The apparatus of any of aspects 16 through 18, where the circuitry coupled with the integrated circuit is further operable to: generate a signal to remove one or more keys from the array in response to detecting that the change to the voltage input satisfies the threshold.

Aspect 20: The apparatus of any of aspects 16 through 19, where the circuitry coupled with the integrated circuit includes an RC circuit.

An apparatus is described. The following provides an overview of aspects of the apparatus as described herein:

Aspect 21: An apparatus, including: an array of memory cells that each include capacitive storage elements; an integrated circuit coupled with the array of memory cells and operable to: receive a clock speed; and modify values written to the capacitive storage elements based at least in part on the clock speed; and circuitry coupled with the integrated circuit and operable to: detect a change to the clock speed, the change satisfying a threshold; and write one or more values of zero to one or more capacitive storage elements of the capacitive storage elements in response to detecting that the change to the clock speed satisfies the threshold.

Aspect 22: The apparatus of aspect 21, where the circuitry coupled with the integrated circuit is further operable to: receive a first clock speed corresponding to a value for the clock speed that is currently received at the apparatus; and receive a second clock speed corresponding to a value for the clock speed that is time-delayed from the value that is currently received at the apparatus, where detecting that the change to the clock speed satisfies the threshold is based at least in part on the first clock speed and the second clock speed.

Aspect 23: The apparatus of any of aspects 21 through 22, where the circuitry coupled with the integrated circuit is further operable to: generate a signal to write the one or more values of zero to the one or more capacitive storage elements in response to detecting that the change to the clock speed satisfies the threshold.

Aspect 24: The apparatus of any of aspects 21 through 23, where the circuitry coupled with the integrated circuit is further operable to: generate a signal to remove one or more keys from the array in response to detecting that the change to the clock speed satisfies the threshold.

Aspect 25: The apparatus of any of aspects 21 through 24, where the circuitry coupled with the integrated circuit includes an RC circuit.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or technologies such as infrared, radio, and microwave, then the coaxial cable, fiber optic cable, twisted pair, digital subscriber line (DSL), or technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving a second input value at a memory device at a second time;
   receiving a first input value at the memory device at a first time;
   receiving, at change detection circuitry of the memory device at a third time, first signaling indicative of a first value for an input to the memory device at the first time;
   receiving, at the change detection circuitry of the memory device at a fourth time, second signaling indicative of a second value for the input to the memory device at the second time that is before the first time, wherein the second signaling is received by the change detection circuitry at the fourth time at least a first threshold duration after the second time based on time delay circuitry of the memory device; and
   disabling one or more features of the memory device based on a comparison of the first value for the input to the memory device at the first time to the second value for the input to the memory device at the second time failing to satisfy a second threshold.

2. The method of claim 1, further comprising:
   detecting a change to the input to the memory device based at least in part on the comparison of the first value for the input to the second value for the input failing to satisfy the second threshold, wherein disabling the one or more features of the memory device is based at least in part on detecting the change to the input to the memory device.

3. The method of claim 1, wherein the input to the memory device comprises a voltage input to the memory device.

4. The method of claim 3, further comprising:
   generating third signaling using circuitry for detecting a change to the voltage input to the memory device, the circuitry for detecting the change to the voltage input coupled with an integrated circuit of the memory device, wherein the first signaling and the second signaling are received by the circuitry for detecting the change to the voltage input, and wherein disabling the one or more features of the memory device is based at least in part on the third signaling.

5. The method of claim 4, wherein the circuitry for detecting the change to the voltage input comprises a resistor-capacitor (RC) circuit.

6. The method of claim 1, wherein the input to the memory device comprises a clock speed that is input to the memory device.

7. The method of claim 6, further comprising:
generating third signaling using circuitry for detecting a change to the clock speed that is input to the memory device, the circuitry for detecting the change to the clock speed coupled with an integrated circuit of the memory device, wherein the first signaling and the second signaling are received by the circuitry for detecting the change to the clock speed, and wherein disabling the one or more features of the memory device is based at least in part on the third signaling.

8. The method of claim 7, wherein the circuitry for detecting the change to the clock speed comprises a resistor-capacitor (RC) circuit.

9. The method of claim 1, further comprising:
calculating a difference between the first value for the input and the second value for the input; and
comparing the difference between the first value for the input and the second value for the input to the second threshold, wherein the comparison of the first value for the input to the second value for the input fails to satisfy the second threshold based at least in part on the difference exceeding the second threshold.

10. The method of claim 1, wherein:
the first value for the input comprises a value currently measured at the memory device for the input; and
the second value for the input comprises a value previously measured at the memory device for the input, the second value for the input measured at least a second threshold duration before the first value for the input is measured.

11. The method of claim 1, further comprising:
generating third signaling based at least in part on the comparison of the first value for the input to the second value for the input failing to satisfy the second threshold; and
writing one or more values of zero to one or more capacitive storage elements of the memory device in response to the third signaling, wherein disabling the one or more features of the memory device comprises at least writing the one or more values of zero to the one or more capacitive storage elements.

12. The method of claim 1, further comprising:
generating third signaling based at least in part on the comparison of the first value for the input to the second value for the input failing to satisfy the second threshold; and
removing one or more keys from non-volatile memory at the memory device in response to the third signaling, wherein disabling the one or more features of the memory device comprises at least removing the one or more keys from the non-volatile memory.

13. The method of claim 1, further comprising:
detecting a modification to the memory device based at least in part on the comparison of the first value for the input to the second value for the input failing to satisfy the second threshold, wherein disabling the one or more features of the memory device is based at least in part on detecting the modification to the memory device.

14. The method of claim 13, wherein:
the memory device comprises a dynamic random-access memory (DRAM) component; and
the modification to the memory device comprises decoupling the DRAM component from a second memory device, decoupling the DRAM component from a host device, or both.

15. The method of claim 13, wherein the modification to the memory device comprises adding an interposer to the memory device, adding cabling to the memory device, adding a socket to the memory device, or any combination thereof.

16. An apparatus, comprising:
an array of memory cells that each comprise capacitive storage elements;
an integrated circuit coupled with the array of memory cells and operable to:
receive a first value of a voltage input at a first time;
modify values written to the capacitive storage elements based on the voltage input; and
receive a second value of the voltage input at a second time; and
circuitry coupled with the integrated circuit and operable to:
receive, by the circuitry at a third time, a first signal indicative of the first value of the voltage input received at the integrated circuit at the first time, wherein the third time is delayed relative to the first time based on time delay circuitry of the apparatus;
receive, by the circuitry at or after the third time, a second signal indicative of the second value of the voltage input received at the integrated circuit at the second time;
detect a change to the voltage input based on a difference between the first value and the second value satisfying a threshold; and
write one or more values of zero to one or more capacitive storage elements of the capacitive storage elements in response to detecting that the change to the voltage input satisfies the threshold.

17. The apparatus of claim 16, wherein:
the second value corresponds to a value for the voltage input that is currently received at the apparatus; and
the first value corresponds to a value for the voltage input that is time-delayed from the second value that is currently received at the apparatus.

18. The apparatus of claim 16, wherein the circuitry coupled with the integrated circuit is further operable to:
generate a signal to write the one or more values of zero to the one or more capacitive storage elements in response to detecting that the change to the voltage input satisfies the threshold.

19. The apparatus of claim 16, wherein the circuitry coupled with the integrated circuit is further operable to:
generate a signal to remove one or more keys from the array of memory cells in response to detecting that the change to the voltage input satisfies the threshold.

20. The apparatus of claim 16, wherein the circuitry coupled with the integrated circuit comprises a resistor-capacitor (RC) circuit.

21. An apparatus, comprising:
an array of memory cells that each comprise capacitive storage elements;

an integrated circuit coupled with the array of memory cells and operable to:
  receive a first clock speed at a first time;
  modify values written to the capacitive storage elements based on the first clock speed; and
  receive a second clock speed at a second time; and
circuitry coupled with the integrated circuit and operable to:
  receive, by the circuitry at a third time, a first signal indicative of a first value of the first clock speed received at the integrated circuit at the first time, wherein the third time is delayed relative to the first time based on time delay circuitry of the apparatus;
  receive, by the circuitry at or after the third time, a second signal indicative of a second value of the second clock speed received at the integrated circuit at the second time;
  detect a change to a clock speed based on a difference between the first value and the second value satisfying a threshold; and
    write one or more values of zero to one or more capacitive storage elements of the capacitive storage elements in response to detecting that the change to the clock speed satisfies the threshold.

22. The apparatus of claim 21, wherein:
the second value corresponds to a value for the clock speed that is currently received at the apparatus; and
the first value corresponds to a value for the clock speed that is time-delayed from the second value that is currently received at the apparatus.

23. The apparatus of claim 21, wherein the circuitry coupled with the integrated circuit is further operable to:
  generate a signal to write the one or more values of zero to the one or more capacitive storage elements in response to detecting that the change to the clock speed satisfies the threshold.

24. The apparatus of claim 21, wherein the circuitry coupled with the integrated circuit is further operable to:
  generate a signal to remove one or more keys from the array of memory cells in response to detecting that the change to the clock speed satisfies the threshold.

25. The apparatus of claim 21, wherein the circuitry coupled with the integrated circuit comprises a resistor-capacitor (RC) circuit.

26. An apparatus, comprising:
one or more memory devices; and
logic coupled with the one or more memory devices and operable to cause the apparatus to:
  receive a second input value at a memory device of the one or more memory devices at a second time;
  receive a first input value at the memory device at a first time;
  receive, at change detection circuitry of the memory device at a third time, first signaling indicative of a first value for an input to the memory device at the first time;
  receive, at the change detection circuitry of the memory device at a fourth time, second signaling indicative of a second value for the input to the memory device at the second time that is before the first time, wherein the second signaling is received by the change detection circuitry at the fourth time at least a first threshold duration after the second time based on time delay circuitry of the memory device; and
  disable one or more features of the memory device based on a comparison of the first value for the input to the memory device at the first time to the second value for the input to the memory device at the second time failing to satisfy a second threshold.

27. The apparatus of claim 26, wherein the logic is further operable to cause the apparatus to:
  detect a change to the input to the memory device based at least in part on the comparison of the first value for the input to the second value for the input failing to satisfy the second threshold, wherein disabling the one or more features of the memory device is based at least in part on detecting the change to the input to the memory device.

28. The apparatus of claim 26, wherein the input to the memory device comprises a voltage input to the memory device.

29. The apparatus of claim 28, wherein the logic is further operable to cause the apparatus to:
  generate third signaling using circuitry for detecting a change to the voltage input to the memory device, the circuitry for detecting the change to the voltage input coupled with an integrated circuit of the memory device, wherein the first signaling and the second signaling are received by the circuitry for detecting the change to the voltage input, and wherein disabling the one or more features of the memory device is based at least in part on the third signaling.

30. The apparatus of claim 29, wherein the circuitry for detecting the change to the voltage input comprises a resistor-capacitor (RC) circuit.

31. The apparatus of claim 26, wherein the input to the memory device comprises a clock speed that is input to the memory device.

32. The apparatus of claim 31, wherein the logic is further operable to cause the apparatus to:
  generate third signaling using circuitry for detecting a change to the clock speed that is input to the memory device, the circuitry for detecting the change to the clock speed coupled with an integrated circuit of the memory device, wherein the first signaling and the second signaling are received by the circuitry for detecting the change to the clock speed, and wherein disabling the one or more features of the memory device is based at least in part on the third signaling.

33. The apparatus of claim 32, wherein the circuitry for detecting the change to the clock speed comprises a resistor-capacitor (RC) circuit.

34. The apparatus of claim 26, wherein the logic is further operable to cause the apparatus to:
  calculate a difference between the first value for the input and the second value for the input; and
  compare the difference between the first value for the input and the second value for the input to the second threshold, wherein the comparison of the first value for the input to the second value for the input fails to satisfy the second threshold based at least in part on the difference exceeding the second threshold.

35. An apparatus, comprising:
means for receiving a second input value at a memory device at a second time;
means for receiving a first input value at the memory device at a first time;
means for receiving, at change detection circuitry of the memory device at a third time, first signaling indicative of a first value for an input to the memory device at the first time;
means for receiving, at the change detection circuitry of the memory device at a fourth time, second signaling indicative of a second value for the input to the memory device at the second time that is before the first time, wherein the second signaling is received by the change detection circuitry at the fourth time at least a first threshold duration after the second time based on time delay circuitry of the memory device; and means for disabling one or more features of the memory device based on a comparison of the first value for the input to the memory device at the first time to the second value for the input to the memory device at the second time failing to satisfy a second threshold.

* * * * *